US010008196B2

(12) United States Patent
Maisonnier et al.

(10) Patent No.: US 10,008,196 B2
(45) Date of Patent: Jun. 26, 2018

(54) METHODS AND SYSTEMS OF HANDLING A DIALOG WITH A ROBOT (71) Applicant: SOFTBANK ROBOTICS EUROPE, Paris (FR)

(72) Inventors: Bruno Maisonnier, Paris (FR); David Houssin, Paris (FR); Rémy Pataillot, Issy les Moulineaux (FR); Gabriele Barbieri, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 0 days. days.

(21) Appl. No.: 15/300,715

(22) PCT Filed: Apr. 17, 2015

(86) PCT No.: PCT/EP2015/058356
§ 371 (c)(1),
(2) Date: Sep. 29, 2016

(87) PCT Pub. No.: WO2015/158878
PCT Pub. Date: Oct. 22, 2015

(65) Prior Publication Data
US 2017/0125008 A1 May 4, 2017

(30) Foreign Application Priority Data

Apr. 17, 2014 (EP) .................................. 14305579

(51) Int. Cl.
*G10L 13/033* (2013.01)
*G10L 13/08* (2013.01)
(Continued)

(52) U.S. Cl.
CPC ......... *G10L 13/0335* (2013.01); *B25J 11/003* (2013.01); *B25J 11/0005* (2013.01);
(Continued)

(58) Field of Classification Search
CPC ............................. G10L 15/22; G10L 13/033
See application file for complete search history.

(56) References Cited

U.S. PATENT DOCUMENTS 6,314,402 B1 * 11/2001 Monaco ................ H04M 3/493
704/270
6,321,198 B1 * 11/2001 Hank ................... H04M 3/4936
704/270
(Continued)

FOREIGN PATENT DOCUMENTS

JP   H05-165486 A   7/1993
JP   H10-133852 A   5/1998
(Continued)

OTHER PUBLICATIONS

Search Report in Russian Application No. 2016144802, dated Jan. 22, 2018.
(Continued)

*Primary Examiner* — Brian L Albertalli
(74) *Attorney, Agent, or Firm* — Baker & Hostetler LLP (57) ABSTRACT A computer-implemented method of handling an audio dialog between a robot and a human user comprises: during the audio dialog, receiving audio data and converting the audio data into text data; in response to the verification of one or more dialog mode execution rules of the text data, selecting a modified dialog mode; wherein a dialog mode comprises one or more dialog contents and one or more dialog voice skins; wherein a dialog content comprises a collection of predefined sentences, the collection comprising question sentences and answer sentences; and wherein a dialog voice skin comprises voice rendering parameters comprising frequency, tone, velocity and pitch. Described developments comprise modifying dialog contents and/or dialog voice skin, using dialog execution rules (for example (Continued)

depending on the environment perceived by the robot) and moderating dialog contents.

19 Claims, 2 Drawing Sheets (51) Int. Cl.
  *G10L 15/22* (2006.01)
  *G06N 3/00* (2006.01)
  *B25J 11/00* (2006.01)
(52) U.S. Cl.
  CPC .............. *G06N 3/008* (2013.01); *G10L 13/08* (2013.01); *G10L 15/22* (2013.01); *G10L 2015/223* (2013.01)

(56) References Cited

U.S. PATENT DOCUMENTS

| | | | | |
|---|---|---|---|---|
| 6,584,376 | B1* | 6/2003 | Van Kommer | G05D 1/0285 379/88.03 |
| 9,141,802 | B2* | 9/2015 | Yao | H04L 9/3247 |
| 2002/0042713 | A1* | 4/2002 | Kim | G10L 15/28 704/272 |
| 2004/0054519 | A1* | 3/2004 | Kobayashi | G10L 13/10 704/1 |
| 2005/0125232 | A1* | 6/2005 | Gadd | G10L 15/26 704/270.1 |
| 2005/0137747 | A1* | 6/2005 | Miro | G06N 3/008 700/245 |
| 2006/0155765 | A1* | 7/2006 | Takeuchi | G06F 17/30654 |
| 2006/0177802 | A1* | 8/2006 | Hiroe | G10L 13/00 434/185 |
| 2006/0195598 | A1* | 8/2006 | Fujita | H04L 29/06 709/230 |
| 2006/0212841 | A1* | 9/2006 | Sinai | G06F 8/38 717/105 |
| 2007/0043568 | A1* | 2/2007 | Dhanakshirur | H04M 3/42144 704/258 |
| 2008/0167875 | A1* | 7/2008 | Bakis | G10L 13/08 704/258 |
| 2008/0255850 | A1* | 10/2008 | Cross | G10L 15/22 704/275 |
| 2008/0291325 | A1* | 11/2008 | Teegan | G10L 13/033 348/552 |
| 2010/0042410 | A1* | 2/2010 | Stephens, Jr. | G10L 13/10 704/260 |
| 2011/0087485 | A1* | 4/2011 | Maude | H04L 12/1827 704/9 |
| 2012/0197436 | A1* | 8/2012 | Maisonnier | B25J 9/1656 700/250 |
| 2013/0066467 | A1* | 3/2013 | Song | B25J 9/1656 700/245 |
| 2013/0110513 | A1* | 5/2013 | Jhunja | G10L 25/54 704/270.1 |
| 2013/0158707 | A1* | 6/2013 | Lee | G06N 5/02 700/246 |
| 2013/0218339 | A1* | 8/2013 | Maisonnier | B25J 11/0005 700/257 |
| 2014/0006319 | A1* | 1/2014 | Anand | G06N 5/02 706/12 |
| 2014/0089651 | A1 | 3/2014 | Yao et al. | |
| 2014/0365068 | A1* | 12/2014 | Burns | G10L 13/033 701/31.5 |
| 2015/0100157 | A1* | 4/2015 | Houssin | G10L 15/1815 700/246 |
| 2016/0199977 | A1* | 7/2016 | Breazeal | B25J 9/0003 700/246 |
| 2017/0116989 | A1* | 4/2017 | Yadgar | G10L 15/22 |

FOREIGN PATENT DOCUMENTS

| | | |
|---|---|---|
| JP | 2000-172289 A | 6/2000 |
| JP | 2004-109323 A | 4/2004 |
| JP | 2007-219149 A | 8/2007 |
| JP | 2010-170033 A | 8/2010 |
| RU | 2336560 C2 | 10/2008 |
| WO | 2013/150076 A1 | 10/2013 |

OTHER PUBLICATIONS

Office Action in Japanese Patent Application No. 2016-562858, dated Jan. 9, 2018.

\* cited by examiner

METHODS AND SYSTEMS OF HANDLING A DIALOG WITH A ROBOT

CROSS-REFERENCE TO RELATED APPLICATIONS

This application is a National Stage of International patent application PCT/EP2015/058356, filed on Apr. 17, 2015, which claims priority to foreign European patent application No. EP 14305579.6, filed on Apr. 17, 2014, the disclosure of which are incorporated by reference in their entirety.

TECHNICAL FIELD

This patent relates to the field of digital data processing and more particularly to the handling of voice synthesis and interactive dialogs, in particular in the specific context of a conversation between a robot and a human user.

BACKGROUND

Companion robots advantageously can establish an emotional relationship with human beings. Dynamic adaptations of dialogs through voice or dialog skins can enable rich interactions.

Existing systems for speech or voice synthesis are mostly passive and uniform: beyond a few options like man or female voice choices, the tone of the speech generation engine is rather neutral. What is more, provided responses lack cultural references. The objective of industrial or mass market voice answering systems precisely is to provide universally accepted responses, i.e. to be as widely understood as possible. This implies to avoid any contextual and a fortiori cultural references. Voice commands are generally limited to specific contexts. For example, voice dictation software is mostly used in the context of a standalone software application (for example Word processing software). According to some accessibility features increasingly provided with modern operating systems, users can use voice commands to perform certain actions (for example launching an application, copy and paste, etc). These predefined actions are rather limited. Such visual or audio interaction modes are generally passive (e.g. users are actively giving orders and the machine executes the orders). Even with recent computer interaction models, such as those implemented in answering systems for example, limited interactions occur from the machine to the user.

In the context of a companion humanoid robot, the interaction model with human users significantly changes when compared with the interaction model with personal computers (and their different forms). The cognitive interaction with a robot is fundamentally different than the one with a tablet PC or a smartphone. In particular, the ability to modulate speech synthesis of the robot can be beneficial if not key to a rich interaction, which in turn can allow to gather relevant data and to improve the services rendered by the robot or connected devices.

There is a need for methods and systems of handling voice synthesis (form) and associated interactive dialogs (substance), in particular in the specific context of a conversation between a robot and a human user.

SUMMARY

There is disclosed a computer-implemented method of handling an audio dialog between a robot and a human user, the method comprising: during said audio dialog, receiving audio data and converting said audio data into text data; in response to the verification of one or more dialog mode execution rules of said text data, selecting a modified dialog mode; wherein a dialog mode comprises one or more dialog contents and one or more dialog voice skins; wherein a dialog content comprises a collection of predefined sentences, said collection comprising question sentences and answer sentences; and wherein a dialog voice skin comprises voice rendering parameters comprising frequency, tone, velocity and pitch.

In a development, the method further comprises executing said selected modified dialog mode.

In a development, the modified dialog mode is obtained by modifying the current dialog content and/or to the current dialog voice skin of the current dialog.

In a development, the step of modifying the current dialog content comprises using synonyms of words of said dialog content and applying syntactic modifications comprising the insertion or the permutation or the substitution of one or more words of said dialog content.

In a development, the step of modifying the current dialog voice skin comprises modifying frequency and/or tone and/or velocity and/or pitch of the current dialog voice skin.

In a development, the modified dialog mode is obtained by activating a predefined dialog mode, said predefined dialog having being selected by the one or more dialog execution rules and said predefined dialog mode comprising a predefined dialog content and/or a predefined dialog voice skin.

In a development, a dialog mode execution rule is dependent on the environment perceived by the robot.

In a development, a dialog mode execution rule comprises parameters selected from the list comprising age of a user, gender of a user, mood of a user, emotion of a user, number of users, interaction history with a user, user preferences, spatial placement of the robot and/or of a user, gesture or combination of gestures of the robot and/or a user, detected event in the environment of the robot, local weather, geolocation, date, time and combinations thereof.

In a development, a dialog mode execution rule is dynamically retrieved from the Internet and/or is user-configurable.

In a development, one or more dialog contents or the selection thereof are moderated by application of one or more filters, said filters comprising blacklists of one or more words, white lists of one or more words and/or dialog mode execution rules.

In a development, dialog content and/or a dialog voice skin is selected by voice command or user request.

In a development, the method further comprises identifying a missing dialog mode, retrieving and installing said missing dialog mode in the robot during the dialog with the user. In a development, the method further comprises receiving the confirmation of the user before executing a selected dialog mode. In a development, the method further comprises receiving the feedback of user after execution of the modified dialog mode. In a development, the steps of the method can be iterated (e.g. the dialog mode can be further modified).

There is disclosed a computer program comprising instructions for carrying out one or more steps of the method when said computer program is executed on a suitable computer device or robotic device. There is disclosed a system comprising means adapted to carry out one or more steps of the method.

A companion robot is generally multimodal. Voice interactions constitute a critical part of the interaction with users, along movements which characterize a robot by contrast with a personal computer and its declinations. Dialogs between a user and a robot can enhance or personalize the interactions and in fine improve the user experience. In an embodiment, the robot adapts itself to the current perceived context through adaptations of its dialog modes. The robot for example can say "Mister" to a foreigner or can use the surname of a person if allowed to do so in the past, speak more or less formal depending on users and/or context. Specific words also can be filtered depending on users, history, feedbacks, moods, location, date and time (for example). When a person does not understand a sentence, the robot can repeat slowly and/or with synonyms, if asked to do so or at its own initiative. The robot also can learn the preferences of the user (speak more or less quickly with which vocabulary), improving the mood of the user.

Advantageously, a robot can implement new languages extensions, rendering each robot unique, initiate positive emotions and therefore strengthen the relationship of the robot with human beings.

Advantageously, according to some embodiments, the man-machine interaction is active and no longer passive: the robot, from a human perspective, can take some initiatives (e.g. the robot can ask questions, for example for disambiguation purposes). Furthermore, with adapted dialog contents or patterns expressed in a personalized or otherwise relevant manner, the man-machine interaction is further optimized.

Advantageously, a conversational mode of interaction allows for a more "intimate" "relationship" with the user, at least more a more "natural" interaction. This better user experience is likely to lead to an increased "understanding" of the human user by the machine. The associated "proximity" with the machine, implied and reinforced by relevant voice skins and/or dialog sentences, can facilitate the collection of data from and about the user. Both the user and the robot can be more "expressive". The term "expressivity" refers to the fact that since the man-machine interaction is being (more) natural, the user communicates more data to the robot, which in turn can know and store more data about the user, enriching further interactions in a virtuous circle. This is not true for a personal computer. A tablet may try to ask "questions", for example in the form of a quiz or questionnaire or by speech synthesis, but as the tablet is not considered as a "companion" which can (autonomously) move itself, displace objects or follow humans, a residual bias will remain. The amount of data which can be captured will be smaller when compared with a companion robot. The fact that the companion robot can use funny or otherwise relevant voice skins or dialog patterns reinforces this ability to capture data.

Information actively or passively gathered about a user (e.g. user profiling or user declared preferences), can be used as an input for launching conditions (e.g. a voice skin or dialog pattern should only launch if the user loves "Bienvenue chez les Ch'tis"). Mechanisms of machine learning can be performed: voice skins or dialog patterns which are launched or executed by the system will evolve depending on what is learned about the user.

BRIEF DESCRIPTION OF DRAWINGS

Embodiments of the present invention will now be described by way of example with reference to the accompanying drawings in which like references denote similar elements, and in which.

DETAILED DESCRIPTION

A "dialog" comprises prefabricated sentences. A dialog is a collection of predefined sentences, including responses to questions. Anticipated responses to a plurality of questions compose a dialog.

A "dialog mode" comprises one or more modification operations which affect both substance ("dialog pattern" or "dialog content") and form ("voice skin" or "voice rendering") of a planned sentence. In other words, a "dialog mode" is associated with a substantive aspect (e.g. the factual content or information conveyed by the message) and with of a formal aspect (e.g. expressivity or emotions or tones of the spoken language). Dialog modes can be implemented in the form of downloadable software programs, said programs comprising instructions which when executed on a suitable robotic device cause said robotic device to perform particular physical actions, comprising performing programmed dialog modes (dialog contents and/or voice skins). A software program can be provided as an "extension module" or a "plug-in" or an "add-on". Additional dialog modes can be combined or added or substituted to the default dialog content and voice skin of the robot. In an embodiment, dialog modes can be called as services for other software applications installed on the robot. For example, a weather application can use Dark Vador's voice in a certain context (e.g. full moon). Dialog modes and/or associated execution rules can be accessed through a network or be accessed locally. In some embodiments, they are complemented or supplemented by accesses to networks and remote knowledge bases.

A "Dialog content" or "dialog pattern" or "dialog topic" refers to a collection of predefined sentences, said sentences corresponding to questions and (anticipated or expected or possible) answers, for example around a certain theme or topic or area of interest (but not necessarily, as a general scope of sentences can be envisioned). Syntactic modifications can modify the substance of existing dialog contents installed in the robot (e.g. insertion of superlative like "super", permutations of words, etc). Dialog contents or patterns can get certain words to be censored (e.g. the use of determined words can be forbidden, be it binary or according probabilities or thresholds), some other words can be allowed or the use of some words can be encouraged (bias). Dialog contents or patterns in particular can comprise (or add, if modified) substantive contents and other cultural references. The choice of words can be dependent from the context and comprise allusions or cultural references. A dialog can comprise thus one or more dialog contents (pre-fabricated dialogs composed of sentences). For example, instead of its mere commercial name, a game application may be known by the robot as "the game with birds and green pigs" or "the game in which you have to throw birds against targets" and the like. These meta-descriptions composed of sentences, possible questions and answers, constitute dialog contents. Such dialog contents allow the robot to have a conversation with the user. For example, if the user asks "I would like to play with the birds", the robot can further ask "Do you want to play with real birds or with virtual birds?". If the user responds "With virtual birds", the robot can ask for confirmation "So you want to play a game?!". If the user responds "Yes", the robot can still further ask confirmation, for example "I have a game in which you have to throw birds against green pigs".

A "Dialog skin" or a "Voice skin" refers to audio rendering modifications. Such audio rendering modifications affect the "form" (e.g. frequency, velocity, pitch and tone). In other words the application of a dialog skin can change radically the expressivity of the robots without modifying underlying pre-fabricated sentences. The impact of the modification of the speech interaction with the robots can be assessed at different levels: content-wise (substance) and/or form (tones, etc). A voice skin can comprise parameters leading to imitate certain voices. A diversity of voice parameters can be handled to manage speech synthesis. Voice parameters comprise frequency (determination if the robot will speak more sharply or deeply), velocity (how fast or slow the robot will speak), tone (for example if actor Sylvester Stallone and character Master Yoda speak at the same velocity and frequency, they do not have the same tone). In an embodiment, a user may require his companion robot to speak like Master Yoda or Sylvester Stallone. By appropriately modifying voice parameters with predefined ones, approaching results can be obtained. Imitations "on the fly" are plausible (recording audio excerpts, deducing parameters and applying relevant modifications) and can allow a robot to imitate one or more users. In an embodiment, a plurality of voice skins can be combined. Some voice skins can be incompatible for a combination (mutually exclusive). Some others may be combined, to some extent. Some others can be additive.

"Dialog execution rules" refer to execution rules that govern the application of one or more voice skins and/or dialog contents or patterns. An "execution rule" can comprise scripts, program code or otherwise Boolean expressions or logical rules which allow adapting phrases that the robot can say (vocabulary, addition of some expressions before or at the end of a sentence, etc). Each time a robot is supposed to say something to a human user (for example because the robot is trying to answer a question or to disambiguate a situation), if a planned sentence of the robot does match one or several dialog execution skins rules, the sentence will be modified according to these rules and subsequently the robot will say it. In an embodiment, one or more dialog execution rules can be applied to one or more sentences (i.e. planned to be said by the robot). In an embodiment, said rules can be applied to each sentence to be said by the robot. In an embodiment, the rules can be applied to a subset of sentences, for example those comprising predefined words or expressions). Dialog execution rules can be predefined. Dialog execution rules also can be dynamically retrieved from the Internet. Some rules can be additive while some others can be mutually exclusive. For example, an execution rule can comprise (e.g. encode) an age limit. Cumulative execution rules can be used or applied. For example a particular voice skin can be authorized in front of users aged above 12 and/or according certain situations (time of the day, measured emotions in audiences, etc). Some execution rules can be configurable by users (e.g. parental controls).

As an example, the sentence "I can dance now" corresponds to a standard predefined phrase (written in the robot memory). "I can dance now hein biloute" corresponds to the phrase expressed by the robot after application of a dialog pattern called "Ch'tis". The audio rendering or voice skin "Ch'tis" can (optionally) further provide the appropriate sound modulations. Form and substance can be diversely modified: specific accents or intonations can be added (e.g. form Northern France), vocabulary used by the robot can be enriched, new conversation topics (e.g. models of questions and answers) can be added.

Dialog modes (dialog contents and/or dialog skins) can be implemented in software packages which can be defined or programmed by software editors. Such software can be modifiable or not. In other words, a dialog mode (e.g. a voice skin) may be fully determined (e.g. no further parameterization can be officially allowed). Alternatively, a dialog mode can be only partially determined. For example, some (e.g. in finite number) local parameters may remain under the control of end users while a majority of settings cannot be changed (to maintain the overall integrity of the voice skin for example).

In other words, a software application, beyond the literal meaning (computer program code which when executed on a suitable computer device can perform one or more steps), can be (or be associated with) a dialog content (e.g. a collection of predefined sentences, including responses to anticipated questions) and/or a dialog skin (e.g. programming on top of dialog contents, i.e. execution rules such as adaptations as functions of the environment, synchronization with movements of the head, activation of lightning's if any, etc) and combinations thereof (e.g a dialog while dancing). Software applications can be interdependent. As a result of a multimodal output, software applications may be further combined (at the output levels or at lower levels, e.g. variables or parameters or scripts can be shared or modified between software applications). For example, a robot can accompany a spoken result "it is −10° C. degrees outside" by a combination of gestures symbolizing the outside cold.

Software applications advantageously can be presented to the user through a dialog interface, i.e. during the course of action of a ("natural") dialog with the user. In other words, the dialog system can act like a "bottleneck" for the user to be able to launch or execute one or more applications.

Figure 1:
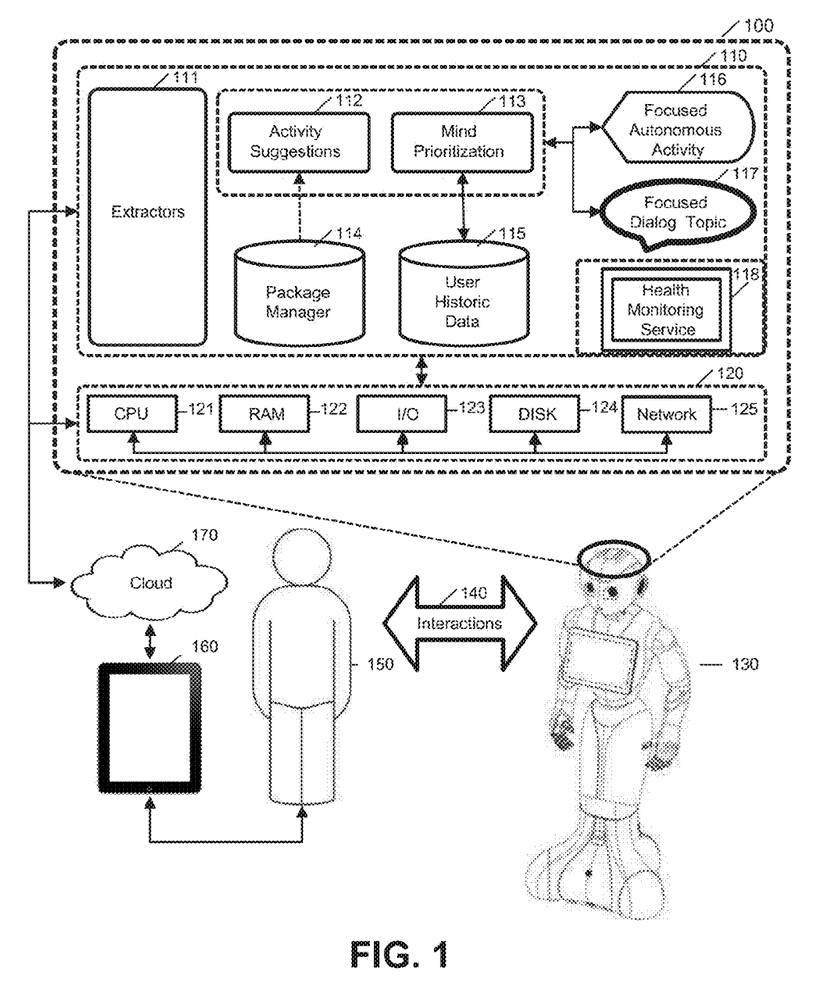
FIG. 1 illustrates the global technical environment of the invention.

The FIG. 1 illustrates the global and technical environment of the invention. A robot 130 comprises sensors and actuators. A logic or "mind" 100 is implemented in the robot or associated with it (for example remotely) and comprises a collection of software 110 and hardware components 120. The robot 130 is interacting (by bilateral or two-ways communications 140, including one or more dialog sessions) with one or more users 150. Said one or more users can access other computing devices 160 (for example a personal computer such as a wearable computer or a smartphone or a tablet), which can be connected devices (in communication with a cloud of servers and/or a fleet of other robots or connected objects, etc). In particular, a connected device can be a wearable computer (e.g. watch, glasses, immersive helmet, etc).

The specific robot 130 on the figure is taken as an example only of a humanoid robot in which the invention can be implemented. The lower limb of the robot on the figure is not functional for walking, but can move in any direction on its base which rolls on the surface on which it lays. The invention can be easily implemented in a robot which is fit for walking.

In some embodiments of the invention, the robot can comprise various kinds of sensors. Some of them are used to control the position and movements of the robot. This is the case, for instance, of an inertial unit, located in the torso of the robot, comprising a 3-axis gyrometer and a 3-axis accelerometer. The robot can also include two 2D color RGB cameras on the forehead of the robot (top and bottom). A 3D sensor can also be included behind the eyes of the robot. The robot can also optionally comprise laser lines generators, for instance in the head and in the base, so as to be able to sense its relative position to objects/beings in its environment. The robot can also include microphones to be capable of sensing sounds in its environment. The robot of the invention can also include sonar sensors, possibly located at the front and the back of its base, to measure the distance to objects/human beings in its environment. The robot can also include tactile sensors, on its head and on its hands, to allow interaction with human beings. It can also include bumpers on its base to sense obstacles it encounters on its route. To translate its emotions and communicate with human beings in its environment, the robot of the invention can also include LEDs, for instance in its eyes, ears and on its shoulders and loudspeakers (for example located in its ears). The robot can communicate with a base station, with other connected devices or with other robots through various networks (3G, 4G/LTE, Wifi, BLE, mesh, etc). The robot comprises a battery or source of energy. The robot can access a charging station fit for the type of battery that it includes. Position/movements of the robots are controlled by its motors, using algorithms which activate the chains defined by each limb and effectors defined at the end of each limb, in view of the measurements of the sensors.

In a specific embodiment, the robot can embed a tablet with which it can communicate messages (audio, video, web pages) to its environment, or receive entries from users through the tactile interface of the tablet. In another embodiment, the robot does not embed or present a screen but it does have a video projector, with which data or information can be projected on surfaces in the vicinity of the robot. Said surfaces can be flat (e.g. floor) or not (e.g. deformations of the projecting surfaces can be compensated to obtain a substantially flat projection). In both embodiments (with screen and/or with a projector), embodiments of the invention remain valid: the claimed interaction model is only supplemented or complemented by visual interaction means. In any case, would the graphical means be out of order or deactivated on purpose, the conversational mode of interaction remains.

In an embodiment, the robot does not comprise such graphical user interface means. Existing humanoid robots are generally provided with advanced speech capabilities but are generally not provided with GUI. Increasing communities of users will probably not use graphical means (e.g. tablet, smartphone), even as a complement, to communicate with the robot, by choice and/or necessity (young people, impaired persons, because of a practical situation, etc).

The collection of software 110 (non-exhaustively) comprises software modules or objects or software code parts, in interaction with one another, including "extractors" 111, "activity suggestions" 112, "mind prioritization" 113, "package manager" 114, "User historical data" 115, "Focused Autonomous activity" 116 and "Focused Dialog Topic" 117 and a "Health Monitoring Service" 118.

An "Extractor Service" 111 generally senses or perceives something internal or external of the robot and provides short term data into the robot's memory. An Extractor service receives input readings from the robot sensors; these sensor readings are preprocessed so as to extract relevant data in relation to the position of the robot, identification of objects/human beings in its environment, distance of said objects/human beings, words pronounced by human beings or emotions thereof. Extractor services in particular comprise: face recognition, people perception, engagement zones, waving detection, smile detection, gaze detection, emotion detection, voice analysis, speech recognition, sound localization, movement detection, panoramic compass, robot pose, robot health diagnosis, battery, QR code handling, home automation, tribes, time and schedule.

An "Actuator Service" makes the robot 130 physically do or perform actions. Motion tracker, LEDs, Behavior manager are "Actuator Services".

A "Data Service" provides long-term stored data. Examples of Data Services are a User Session Service 115, which stores user data, and their history of what they have done with the robot and a Package Manager Service 114, which provides a scalable storage of procedures executed by the robot, with their high level definition, launch conditions and tags. "Package Manager" in particular provides the scalable storage of Activities and Dialogs, and the Manifest. The "Manifest" contains metadata such as launch conditions, tags, and high level descriptions.

A "Mind Service" (for example a service Mind Prioritization 113) is one that will be controlled by the robot's central "Mind" when it is initiating action. "Mind Services" tie together "Actuator services" 130, "Extractor services" 111 and "Data services" 115. Basic Awareness is a "Mind Service". It subscribes to "Extractor Services" such as People perception, Movement detection, and Sound localization to tell the Motion Service to move. The "Mind" 113 configures Basic Awareness's behavior based on the situation. At other times, Basic Awareness is either acting own its own, or is being configured by a Running Activity.

"Autonomous Life" is a Mind Service. It executes behavior activities. Based on the context of a situation, the Mind can tell autonomous life what activity to focus ("Focused Autonomous Activity" 116). Metadata in manifests tie this information into the mind. Any activity can have access to one or more of the Operating System APIs. Activities can also directly tell Autonomous Life what activity to focus, or tell the Dialog Service what topic to focus on.

The "Dialog" service can be configured as a Mind Service. It subscribes to the speech recognition extractor and can use "Animated Speech Actuator Service" to speak. Based on the context of a situation, the Mind can tell the Dialog what topics to focus on (a "Dialog Topic"). The "Dialog" service also has its algorithms for managing a conversation and is usually acting on its own. One component of the Dialog service can be a "Focused Dialog Topic" service 117. Dialog Topics can programmatically tell the Mind to switch focus to (or execute or launch) a different Activity or Dialog Topic, at any time. One example of possible method to determine the Dialog Topic can comprise: at the moment that an dialog topic or activity's launch conditions become true or false, a list of all possible Activities or Dialog Topics for the moment is sent to the Mind; the list is filtered according to activity prioritization; the list order is randomized; the list is sorted (or scored) to give precedence to Activities or Dialog Topics that are "unique" and have been started less often; a special check to make sure the top Dialog Topic or Activity in this list isn't the same activity as the previous activity that was executed. The list can be again sorted and filtered according to the preferences of the user.

The robot can implement a "health monitoring" service 118. Such a service can act as a daemon or a "watchdog", to review or control or regulate the different priorities of the robot. Such a service can monitor (continuously, intermittently or periodically) the status of the internal components of the robot and measure or anticipate or predict or correct hardware failures. In a development, the fleet (e.g. installed base) of robots is monitored. The embedded service can continuously detect faulty situations and synchronize them with a "cloud" service (once every minute for example).

Hardware components 120 comprise processing means 121, memory means 122, Input/Output I/O means 123, mass storage means 124 and network access means 125, said means interacting with one another (caching, swapping, distributed computing, load balancing, etc). The processing means 121 can be a CPU (multicore or manycore) or a FPGA. The memory means 122 comprise one or more of a flash memory or a random access memory. The I/O means 123 can comprise one or more of a screen (e.g. touch screen), a light or LED, a haptic feedback, a virtual keyboard, a mouse, a trackball, a joystick or a projector (including a laser projector). The storage means 124 can comprise one or more of a hard drive or a SSD. The network access means can provide access to one or more networks such as a 3G, 4G/LTE, Wifi, BLE or a mesh network. Network traffic can be encrypted (e.g. tunnel, SSL, etc).

In an embodiment, computing resources (calculations, memory, I/O means, storage and connectivity) can be remotely accessed, for example as a complement to local resources (available in the robot itself). For example, further CPU units can be accessed through the Cloud for voice recognition computing tasks. Computing resources also can be shared. In particular, a plurality of robots can share resources. Connected devices in the vicinity of the robot also can share resources to some extent, for example via secured protocols. Display means also can be shared. For example, the television can be used as a further display by the robot when passing by.

Figure 2:
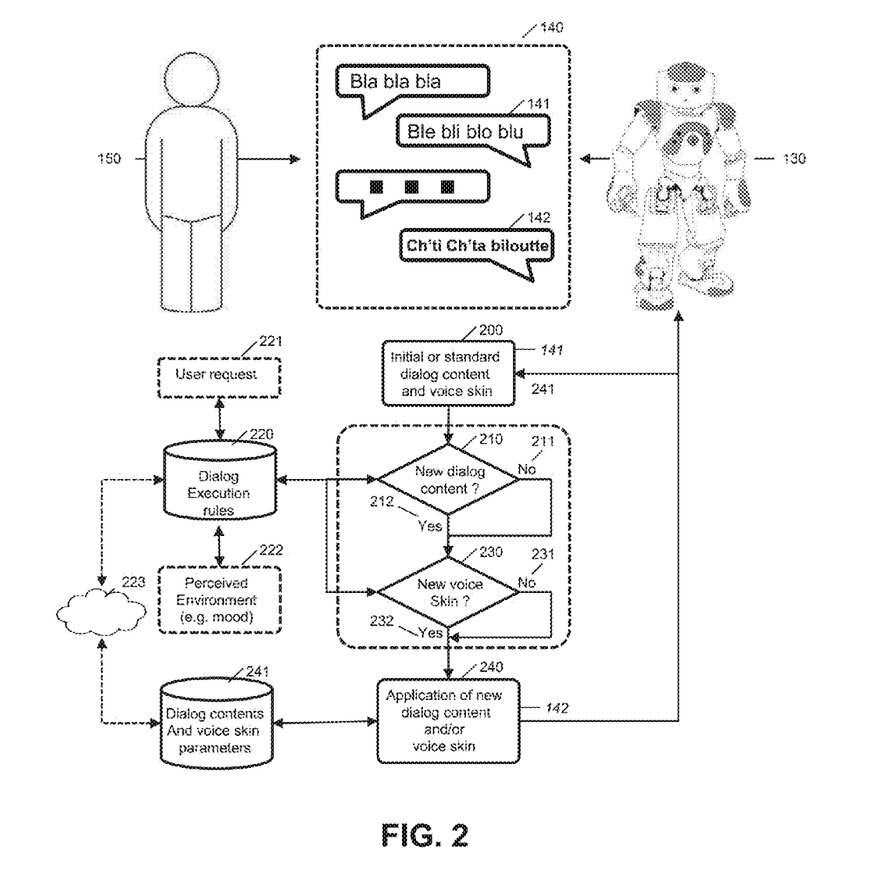
FIG. 2 details some aspects of an embodiment of the method.

The FIG. 2 details some aspects of an embodiment of the method. A robot 130 is interacting (e.g. dialogs, gestures, commands) with a human user 150. Parts of the interactions are dialogs 140, comprising sentences (answers, questions, orders, assertions, comments, etc). The robot generally uses its default standard voice skin (form) and outputs standard and predefined dialog contents (substance). For example, the robot says the dialog sentence 141. Depending on certain parameters (users requests or environmental parameters), the robot can switch to another voice skin and/or to another dialog content, for example 142. The robot also can switch back to the initial or default voice. In more details, starting with the default voice skin and dialog content 200 (or from an initial/modified voice skin and/or modified dialog content), dialog execution rules 220 determine if and to what extent the dialog has to be modified.

The dialog execution rules 220 are for example influenced or determined by a user request 221 and/or by a perceived environment 222 (for example determined through the sensors or the robot, filtered by extractors or according to described embodiments regarding the logic implemented in the Mind of the robot). For example, environmental parameters comprise: age group of the one or more users in the vicinity (kid, adult), gender of one or more users in the vicinity, total number of users in the vicinity, current location, current date and time, current mood of one or more users (e.g. smiling, laughing, crying, etc). The user request 221 corresponds to an "on demand" mode of activation of a new dialog mode (for example the user can say "now imitate Dark Vador"). The determination through the perceived environment underlines the "automatic triggering" mode of activation of a new dialog mode. The robot proactively can activate or deactivate one or more parameters of the dialog modes (attenuate or exaggerate the voice skin, adapt dialog contents, etc). The two modes of activation (or de-activation) can be combined, i.e. the triggering of a new dialog mode can determined partly by user requests and partly by the environment. For example, upon a user request, environmental parameters can confirm or inhibit a change in dialog mode. Alternatively, an automatic switch may require a confirmation or an authorization by the user to be activated. Dialog modes generally can be activated or deactivated at any time. In an embodiment, hopefully funny, a robot can use a plurality of dialog modes back and forth. Optionally, a limit in the number of changes can be implemented (to avoid user saturation or to give the impression that the robot is insane).

The dialog execution rules 220 act on substance and/or form, which remain handled independently. Rules can determine the loading of new dialog contents 210 (for example references to theater movies, by expressing well-known sentences), as well as controlling audio rendering changes 230. Even if no dialog content is selected 211, a new voice skin can be applied 230. New or modified dialog content also can be applied without a new voice skin 231. Determined parameters are applied to the dialog mode (or a new dialog mode is loaded or substituted to the current dialog mode used by the robot). For example, the dialog mode called "Ch'tis" is applied and the sentence 142 is pronounced. It is observed that, in whole or in parts, dialog contents and/or voice skins parameters can be retrieved from the Internet or Cloud 223.

Examples of dialog modes (dialog contents and of voice skins in particular) are now described.

In an embodiment, "utilities" dialog mode (e.g. modifications of dialog contents) allow to use one or more dictionaries (or thesaurus) in order for the robot to be able to say a given sentences in different manners. For example, synonyms can be used. Advantageously, such an embodiment avoids the robot to repeat words. Linguists (editing prefabricated dialog sentences) can write a lot of dialog contents or topics, in order to make the robot to be able to speak about a lot of things. The use of synonyms increases the diversity of expression of the robot, as human do together when using different words. Dialog modes can render dialog sentences different. For example instead of repeating "the weather is nice today", the robot will be able to say "the weather is lovely today"

In an embodiment, "local" adaptations allow to customize or personalize dialog contents and/or voice skins depending on multiple parameters, including geolocation. For example, some linguistics features of some geographic territories— e.g. where the robot will be commercialized—can be handled by the application of an appropriate voice skin. In such an embodiment, the pronunciation of certain words can be adapted, for example based on geolocation. A triggering condition of a voice skin for example can comprise geolocation parameters. In practice, a robot commercialized in the South of France can automatically load a Southern French accent, and vice versa for a Northern accent for the North of France. Idiomatic expressions also can be applied.

In an embodiment, "educational" dialog modes can be implemented or executed. Generally speaking, as the addition of substantive content can be part of the application of a dialog mode, some educational scope can be envisioned. In such a mode, educational dialog modes can be implemented (e.g. with prerequisites, definition of objectives, educational contents as such, verification steps of assimilation). Users can learn foreign languages with the companion robot. They also can discover aspects of their mother tongue. For example, different language styles can be taught to young users (French "soutenu", French "Verlan", French "argot", etc). Dialog modes also can implement specific professional jargons (medical, attorney, etc).

In an embodiment, "fun" dialog modes can be implemented. The robot for example can mimic or refer to recently released theater movies. For example, a voice skin can be a "Dark Vador" or a "Master Yoda" skin (the Yoda character often permutes verbs and subjects, Dark Vador can add "I am your father" at the end of a sentence and breathe with noise).

In a development, the release of a movie theater is associated with a downloadable program which when loaded onto the robot causes said robot to implement a specific dialog mode (in terms of dialog content and/or of voice skin expressivity). For example, after the release of a movie theater like "Bienvenue chez les Ch'tis", a corresponding dialog mode can be available as a "goodies" or a derivative product. In an embodiment, a QR code available on the back of the DVD jacket or on a cinema ticket can be read by image acquisition means and their corresponding software program implementing the corresponding dialog mode can be downloaded and further installed. Optionally, the duration of effects of such a software program can be limited in time (for example two weeks). In another embodiment, famous stars or celebrities or heroes can have their digital dialog mode counterparts. For example, a fan of Claude François (a famous singer in France) may implement in a robot the corresponding voice skin (e.g. voice imitations, intonations) and/or dialog contents (e.g. replicas, quotations, interview exact replications or reconstructions, etc). As a multimodal object, in addition to the described dialog modes (and optionally), the robot for example can choreograph or dance like Claude François or respond exclusively with real excerpts of past recorded interviews of the singer (with respect to copyright aspects if applicable).

In an embodiment, the robot can reach long term assimilations from the interactions with the user. For example, a personalized and persistent dialogue model can be progressively associated with a given robot. The selection and persistence of long-term traits can help define uniqueness of "character" associated with a robot. For example, certain expression like "vin de diouss" may present a sufficiently high acceptance along certain users so that a particular aspect of the skin will be permanently implemented. Skins after skins, the "personality" of a robot thus can be consolidated, mixing different particularities of different dialog modes, and in particular of voice skins.

Language interactions can imply a learning curve, both for the robot and for the user. Such an interaction can be named "social interaction", even if one of the participants is a robot. Repetitive and iterative language interactions, punctuated by encouragements (confirmations) for example can facilitate learning activities. Dialog interactions generally decrease the separation between "utilization" and "learning" phases. A companion robot can try to mimic its "educators", e.g. reusing spoken expressions of humans and/or with a similar voice speed. More interactions with the robot generally mean more relevant interactions, as the knowledge bases are enriched and cross-checked.

Examples of the triggering of dialog modes (e.g. activation or deactivation of dialog contents and/or dialog skins, for example with execution rules) are now described.

A dialog mode (e.g. a voice skin) can be associated with one or more execution rules. Dialog modes can be triggered (activated or deactivated) according to such execution rules. Different embodiments are described hereinafter. There are several ways to trigger the launch or execution of a dialog mode comprising dialog content and dialog voice skin during a dialog comprising sentences between a human user and a robot. These different ways (in particular described hereinafter) to trigger the launch or execution of one or more dialog modes can be independent and can be further combined with one another.

In an embodiment, the launch or execution of one or more software applications is triggered during a dialog with a user (interaction with the user). The audio signal is captured, optionally filtered and enhanced, a speech-to-text operation is performed (locally on the robot and/or remotely on the cloud), the obtained text is analyzed and one or more comparisons are performed with said patterns. Upon one or more matches, optionally with thresholds, one or more dialog mode are selected among those installed on the robot. As a result, one or more dialog modes are executed.

In an embodiment, the launch of a dialog mode is fully automatic, i.e. without the consent or the confirmation of the user. In a development, a user or super-user (e.g. a parent) can interrupt or suspend or terminate or end the execution of a dialog mode. In another embodiment, the launch of a dialog mode requires an explicit confirmation by the user. The robot can declare its intention to launch a certain dialog mode, but will wait for the confirmation before continuing. For the example, the robot can declare "I propose to speak like Dark Vador" and the user still can reply "not now".

In an embodiment, dialog modes can be executed depending on launching conditions or parameters. These conditions or parameters can be facts or rules or both (rules on facts). These facts for example comprise the type or category of user, the current context or situation or environment, characterized by one or more environment values (e.g. current local weather, date and time, emotions detected, number of users, etc). The execution rules range from simple to complex rules. The execution rules can be conditional. For example in an embodiment, a plurality of rules has to be simultaneously satisfied in other to authorize or allow the execution of a dialog mode. In another embodiment, a plurality of rules has to be sequentially satisfied (for example in a certain order and/or with time limits or thresholds). Some execution rules can be predefined. Some other execution rules can be dynamically defined (for example, some rules can be retrieved from the Internet).

In an embodiment, an execution rule can be a simple rule. For example, an execution rule can comprise (e.g. encode) an age limit. In another embodiment, a plurality of execution rules can be used or applied, cumulatively. For example a particular voice skin can be authorized in front of users aged above 12 and/or according certain situations (time of the day, measured emotions in audiences, etc). In an embodiment, the application of a dialog voice skin or a dialog content is triggered by the robot upon detection of a predefined event, said event determining a specific combination of time criteria (calendar, time of the day, etc) and spatial criteria (number of users detected in the vicinity, respective ages of said users, emotional attitudes perceived from said users, e.g. smiling or not)

In an embodiment, some execution rules can be configurable by the user (e.g. parental controls). Some execution rules can be predefined while other execution rules can be dynamically retrieved, for example from the Internet and/or from other robots. Dialog modes can be activated or deactivated during a same dialog: these activations or deactivations can be dynamic, e.g. can depend on the perceived environment in different manners.

In an embodiment, a dialog mode (i.e. a dialog content and/or a dialog skin, independently) can be activated or terminated depending on several parameters, comprising the use of "tags" and/or the use of "conditions" and/or the use of "preconditions".

Tags are markers which can be associated to one or several expressions which can be said by the robot. These tags can be activated or deactivated dynamically and can determine if associated expressions can be saved or not. For example, after the robot as asked "do you like to talk about cooking?", if the user responses "no, I have no interest in cooking" (or the like), the tag "cooking" is deactivated. The robot updates the list of the dialog topics associated with the identified user. The robots will in the future avoid said dialog topic.

"Conditions" and "cross conditions" enable to modify what the robot is going to say as a function of predefined variables (user preferences for example). For example to the question asked by the robot "what age are you", the user may respond "I am 12". In this case, the robot stores the value 12 as the age of value of the user being identified. Later on, the robot can ask "what are you doing tonight". If the user responds "nothing", the robot stores the response as the variable associated with "evening activity". From the age group and the absence of occupation in the evening, the reasoning of the robot can later in the evening infer or propose "do you want to play with me?".

In an embodiment, the triggering (i.e. activation or deactivation of a dialog mode or voice skin or dialog content) can be driven by the context (e.g. the environment, data, time, location, etc). In an embodiment, the robot can monitor and record one or more user expressions. Upon detection of a word like "atmosphere", the robot then can say "atmosphere, atmosphere, est ce j'ai une gueule d'atmosphere?". This is an example of a cultural reference. Yet dialogs can also be triggered by much more elaborated facts and rules, for example by so-called "event" detections. For example, certain dialog modes or skins may not be allowed in presence of certain age groups. In practice the robot for example can assess that at least a user is aged below 12 and detect the word "French fries" in a conversation and subsequently load a specific predefined skin ("Ch'tis"). Another example of an event occurs when a user touches the head of the robot. In such a case, a specific skin may be loaded, activated and executed. Events can comprise parameters such as: spatial placement, gesture or combination of gestures, content of a dialog (keywords or key expressions), assessment of age groups and or genders, user preferences.

In an embodiment, one or more applications are executed during a dialog, triggered by the fulfillment (or verification or satisfaction) of one or more execution rules. A dialog between man and machine is monitored and "patterns" are (for example) continuously extracted from the dialog flow ("collaborative dialog" mode). In an embodiment, the speech flow is received and continuously analyzed. The extraction goes beyond the mere extraction of voice commands (e.g. key expressions) in a speech flow with or without a marker ("OK Glass, take a picture"), In particular, words or expressions of the user are extracted and compared or matched against predefined conditions, tags, markers or cross-conditions.

In another embodiment, one or more execution rules are predefined. The software application is provided by the editor or publisher with a file comprising a list of execution rules to be able or allow or to authorize the execution of said dialog modes. Execution rules are tested: if they are satisfied or allowed or verified, one or more dialog modes can be selected. Some rules may be the minimal criteria to fulfill. Some other rules time can define preferred launch or execution conditions. For example, a minimal execution rule may be "if user is aged below 12 and it is before 22 pm, Dark Vador voice skin is authorized", a preferred rule can be "if three users are located within 5 m, and at least two users are aged under 12, and at least one is smiling and if no other counter indications, then propose a joke with Dark Vador's voice".

Various embodiments are now described.

Retroaction loops and relevance feedback are now described. In one embodiment, the overall success or failure of a given dialog mode (e.g. voice skin), from the perspective of a human user, can be received and/or quantified. In a development, with a fine-grained granularity, each language initiative of the robot can be either confirmed or disconfirmed by the user (for example, by detecting an explicit approval or even an implicit one resulting from a complex human behavior combining gesture and voice commands). Moreover, a collaborative model can be implemented: the validation or invalidation of a given expression can be performed statistically among communities of users/robots. For example, if the expression "cha va biloute" receives positive feedbacks on a fraction of the installed base superior to 75%, said expression can be validated on a global scale. A contrario, if the expression "à l'arvoïure" receives too little positive feedbacks (or receives negative feedbacks), said expression can be permanently removed from the specific dialog mode or model.

In a development, the responses provided by human beings to "skinned" dialogs can be recorded and further leveraged. In an embodiment, the responses are used to weigh in the quality of the robot interventions. In another embodiment, the substance of their responses can in turn be used to further enrich the conversation models. For example, if a response if recurrently observed, then the response is further reused in the dialog mode (i.e. dialog contents).

Regarding business aspects involving technical matter, in an embodiment, dialog modes (e.g. voice skins) are distributed via an electronic marketplace. Some skins can be free to download; some others can require a payment. Some skins may be limited in time, territory or other hardware requirements.

Even if a companion robot can theoretically record every word the human is saying, privacy aspects prevent such recordings. By using machine learning techniques, high-level and non-intrusive features may still be acquired by the robot. For example, with machine learning techniques, recurrent patterns can be extracted (type of vocabulary, preferred expressions, etc). Likewise, limited extractions from theater movies can occur from the analysis of subtitles (in the example of Master Yoda, dialog contents can be determined from such an analysis). Regarding aspects of tone and frequency, supervised learning can allow the robot to imitate certain designated persons. For example, the robot can start to speak and can be further asked to modify certain parameters ("speak a bit more sharply"). In an embodiment, automated comparisons can be performed between the implemented voice skin and real audio excerpts, thereby offering opportunities for improvement feedback loops.

The authoring of dialog contents is now described. Different entities can possibly edit dialog contents. In an embodiment, the operator or the robotic platform can author dialog sentences (e.g. linguists do write dialog sentences). In an embodiment, dialog contents are written and commercialized by third party companies (for example software developers). In an embodiment, dialog modes are written by users or owners of robots. For example, software tools ("DJ-skins") or web platforms can facilitate the creation or modification of voice skins. Users can submit new voice skins, edit them online, vote or rate for popular ones. Edition can comprise mixing predefined voice skins and/or providing users with some creation controls to fine tune voice skins and/or uploading and sharing sounds or recorded sentences, or combinations thereof. Available skins can come with a license or without, for free or a payment. Voice skins can be selected by the user of the robot, who for example can listen to different applications of different voice skins and choose or select one or more preferred ones. In another embodiment, dialogs are co-authored by diverse entities. In an embodiment, dialogs are consolidated from the installed base of robots and from the very responses of users who are the owners of the different robots. Said consolidation can be complimentary to the initial dialogs. In another embodiment, also as complement or an alternative, dialog contents are written by extractions conducted on Internet contents (for example, supervised or unsupervised methods can allow to identify, extract and to use questions and answers). Advantageously, such embodiments allow for rapid improvements of dialog contents, receiving distributed feedbacks. Said improvements can rapidly be propagated across the installed base. For example, by using closed-loop machine learning, popular voice skins can be propagated around the world.

If multiple entities can contribute to the definition of dialog modes (i.e. providing dialog contents and/or voice skins and/or associated execution rules), the final implementation can be controlled by the provider of the robot. Further control or regulation layers can modulate or filter or attenuate or amplify or increase or encourage or decrease or inhibit or limit or avoid or forbid the use of dialog modes. In particular, as described, the use of dialog modes can be regulated by execution rules: the manufacturer or the provider of the robot can master these rules, or partly.

In an embodiment, the provider of the robot can control the final audio rendering device, i.e. the latest point before analogical restitution. In other words, the planned audio expression of the robot resulting from the application of a selected dialog mode or content or skin to a prefabricated sentence of a dialog can be filtered out before effective audio restitution.

In order to be sure or reasonably sure that the robot will not pronounce any bad words, white lists of authorized words and black lists of forbidden words, as well grey lists (words or expressions which can be authorized or not depending on the actual context) can be implemented. In such a case, the result of the application of a voice skin on a prefabricated sentence of a dialog content can be compared against such lists. Complex logical rules, beyond the use of lists, can be used as well. Upon success, if authorized or allowed, the sentence is pronounced (and/or modified accordingly).

Another regulation method of the application of one or more dialog content and/or voice skins to the final dialog expressed by the robot can comprise the use of secured boot methods. For example, each software package coding a particular dialog mode can be associated with the hash value (e.g. of the program in binary form). The appropriate presence of said program attested by the verification of the hash value of the software packages installed in the robot can conditionally authorize the booting up of the robot (or to some restrictions in functionalities) after successful verification.

As a further regulation of the execution of dialog modes (generally of software applications installed in the robot), a health monitoring service of the robot can adjust execution priorities. In particular, the execution of software applications can take into account such a "health monitoring" service. In other words, higher-level priority schemes can further regulate the execution of software applications, including dialog modes. In an embodiment, the robot is not in interaction with a user (i.e. is interacting with nobody). In such a case, the robot performs or can perform autonomous tasks. In another embodiment, the robot is in danger (e.g. "safeguard mode", battery level low or critical, presence of an obstacle or risk of falling, etc). In such a case, the priority of the robot is to handle and solve its own issues (e.g. to perform its own tasks). For example, if the battery level is critical, the robots can interrupt a dialog with a user and try to reach the energy source base. A dialog mode can be activated if a user is detected in the vicinity and/or if the robot is not in a critical situation (in which the robots could not execute its basic functions). To the opposite, a dialog mode module can be deactivated if no user is detected in the vicinity and/or the robot is in a critical situation.

The disclosed methods can take form of an entirely hardware embodiment (e.g. FPGA), an entirely software embodiment or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. A computer-implemented method of handling an audio dialog between a companion robot and a human user, the method comprising:

during said audio dialog, receiving audio data and converting said audio data into text data;

in response to verification of one or more dialog mode execution rules of said text data, selecting a modified dialog mode;

wherein a dialog mode comprises one or more dialog contents and one or more dialog voice skins;

wherein a dialog content comprises a collection of predefined sentences, said collection comprising question sentences and answer sentences;

wherein a dialog voice skin comprises voice rendering parameters comprising frequency, tone, velocity and pitch;

wherein said one or more dialog contents and/or voice skins are authored or edited online using a web platform;

wherein one or more predefined dialog contents and/or voice skins are modified by multiple parties;

wherein one or more dialog contents or a selection thereof are moderated by application of one or more filters, said filters comprising blacklists of one or more words, white lists of one or more words and/or dialog mode execution rules; and wherein a moderation of use of said one or more dialog content and/or voice skins to a final dialog expressed by the companion robot comprise the use of secured boot methods.

2. The method of claim 1, wherein an edition of one or more dialog contents and/or voice skins comprises one or more steps comprising mixing predefined voice skins and/or providing a web platform user with creation controls to fine tune voice skins and/or uploading and sharing sounds or recorded sentences or combinations thereof.

3. The method of claim 1, wherein one or more predefined dialog contents are extracted from the Internet.

4. The method of claim 1, further comprising modifying one or more dialog contents, receiving one or more user feedbacks and propagating said one or more modified dialog contents to another robot.

5. The method of claim 1, further comprising regulating the use of one or more dialog contents, said regulating step comprising one or more steps comprising modulating, filtering attenuating, amplifying, increasing, encouraging, decreasing, inhibiting, limiting, avoiding or forbidding the use of one or more dialog contents and/or voice skins and/or associated execution rules.

6. The method of claim 1, wherein a manufacturer of the robot has control over a final audio rendering or latest point before analog audio restitution.

7. The method of claim 1, further comprising executing said selected modified dialog mode.

8. The method of claim 1, wherein the modified dialog mode is obtained by modifying the current dialog content and/or to the current dialog voice skin of the current dialog.

9. The method of claim 8, wherein modifying the current dialog content comprises using synonyms of words of said dialog content and applying syntactic modifications comprising insertion or permutation or substitution of one or more words of said dialog content.

10. The method of claim 8, wherein modifying the current dialog voice skin comprises modifying frequency and/or tone and/or velocity and/or pitch of the current dialog voice skin.

11. The method of claim 1, wherein the modified dialog mode is obtained by activating a predefined dialog mode, said predefined dialog having been selected by the one or more dialog execution rules and said predefined dialog mode comprising a predefined dialog content and/or a predefined dialog voice skin.

12. The method of claim 1, wherein a dialog mode execution rule is dependent on an environment perceived by the robot.

13. The method of claim 12, wherein a dialog mode execution rule comprises parameters selected from the list comprising age of a user, gender of a user, mood of a user, emotion of a user, number of users, interaction history with a user, user preferences, spatial placement of the robot and/or of a user, gesture or combination of gestures of the robot and/or a user, detected event in the environment of the robot, local weather, geolocation, date, time and combinations thereof.

14. The method of claim 1, wherein a dialog mode execution rule is dynamically retrieved from the Internet and/or is user-configurable.

15. The method of claim 1, wherein a dialog content and/or a dialog voice skin is selected by voice command or user request.

16. The method of claim 1, further comprising identifying a missing dialog mode, retrieving and installing said missing dialog mode in the robot during the dialog with the user.

17. The method of claim 1, further comprising receiving the confirmation of the user before executing a selected dialog mode.

18. A non-transitory computer program comprising instructions for carrying out the steps of the method according to claim 1 when said non-transitory computer program is executed on a suitable computer device.

19. A system comprising means adapted to carry out the steps of the method according to claim 1.

* * * * *